US011720719B2

(12) United States Patent
Kondo et al.

(10) Patent No.: US 11,720,719 B2
(45) Date of Patent: Aug. 8, 2023

(54) APPARATUSES AND METHODS FOR SIGNAL ENCRYPTION IN HIGH BANDWIDTH MEMORY

(71) Applicant: MICRON TECHNOLOGY, INC., Boise, ID (US)

(72) Inventors: Chikara Kondo, Tokyo (JP); Kazuhiro Kurihara, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 638 days.

(21) Appl. No.: 16/589,989

(22) Filed: Oct. 1, 2019

(65) Prior Publication Data
US 2021/0097209 A1    Apr. 1, 2021

(51) Int. Cl.
*G06F 21/85*     (2013.01)
*G06F 21/79*     (2013.01)
*G11C 29/12*     (2006.01)
*G06F 12/14*     (2006.01)
*G06F 21/60*     (2013.01)

(52) U.S. Cl.
CPC .......... *G06F 21/85* (2013.01); *G06F 12/1408* (2013.01); *G06F 21/602* (2013.01); *G06F 21/79* (2013.01); *G11C 29/1201* (2013.01)

(58) Field of Classification Search
CPC .... G06F 21/85; G06F 12/1408; G06F 21/602; G06F 21/79; G11C 29/1201
See application file for complete search history.

(56) References Cited

U.S. PATENT DOCUMENTS

| 2005/0005217 | A1* | 1/2005 | Whetsel | G01R 31/31723 |
| | | | | 714/727 |
| 2012/0102334 | A1* | 4/2012 | O'Loughlin | H04L 9/0877 |
| | | | | 713/189 |
| 2016/0118142 | A1* | 4/2016 | Sugahara | G11C 29/36 |
| | | | | 714/719 |
| 2019/0198082 | A1* | 6/2019 | O | G06F 3/0623 |

OTHER PUBLICATIONS

Emanuele Valea, Mathieu da Silva, Marie-Lise Flottes, Giorgio Di Natale, Bruno Rouzeyre. Encryption-Based Secure JTAG. DDECS 2019—22nd International Symposium on Design and Diagnostics of Electronic Circuits and Systems, Apr. 2019, Cluj-Napoca, Romania, pp. 1-6, ff10.1109/DDECS.2019.8724654ff. ffhal-02149061.*

* cited by examiner

*Primary Examiner* — Matthew T Henning
(74) *Attorney, Agent, or Firm* — Dorsey & Whitney LLP (57) ABSTRACT

Apparatuses, systems, and methods for signal encryption in high bandwidth memory are described. A high bandwidth memory (HBM) may include a mix of secure circuits and non-secure circuits, which are coupled to secure and non-secure registers respectively. Information may be communicated between the secure and non-secure registers along an interface. The information associated with the secure register may be encrypted. When information is written to the secure register, an encryption circuit in the HBM may first decrypt the information before it is written to the secure register. When information is read from the secure register, it may first be encrypted by the encryption circuit before it is provided along the interface.

11 Claims, 7 Drawing Sheets

FIG. 7

APPARATUSES AND METHODS FOR SIGNAL ENCRYPTION IN HIGH BANDWIDTH MEMORY

BACKGROUND

This disclosure relates generally to semiconductor devices, and more specifically to semiconductor memory devices. memory devices may include a variety of circuits which may be used to carry out various functions of the memory. Some memory devices may be mounted on a second device such as a host device (e.g., a graphics card, a CPU, a computing system, etc.). Access to the circuits of the memory may generally be performed through the host device. For example, instructions for the operation of the circuits, and data from those circuits may be passed along an interface bus which couples the memory device to the host device.

DETAILED DESCRIPTION

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory devices, such as high bandwidth memory (HBM) devices, may include a variety of internal circuits which are used to perform functions. For example, the memory device may include a built-in self-test (BIST) circuit which is used to test the performance (and/or measure other properties) of the memory device. The memory device may be packaged onto a host device and an interface bus may couple the memory device to the host device. Information such as test instructions may be provided by the host device along the interface bus to the memory device, and information such as test results may be received by the host device from the memory device along the interface bus. The memory device may include secure circuits which may receive or provide information that is desirable to be kept secure (e.g., details of the operation of the memory device, performance of specific parts of the memory device, etc.). The memory device may also contain non-secure circuits which may receive or provide information which may not need to be kept secure (e.g., because that information is based on a publicly available specification). The interface bus may therefore carry a mix of secure and non-secure information. However, since the information is coupled in and out of the memory device through the host device, it may be possible for the host device to monitor the information. Therefore, it may be desirable to protect the secure portion of the information along the interface.

The present disclosure is drawn to apparatuses, systems, and methods for signal encryption in high bandwidth memory. A portion of the information along the interface bus between the host device and the memory device may be encrypted. The encrypted portion may be the portion of the information associated with the secure circuits of the memory device. The memory device may include registers, such as wrapper data registers (WDRs), which are coupled to the interface bus. The WDRs may include a secure WDR which stores information associated with the secure circuits and a non-secure WDR which stores information associated with non-secure circuits. For example, a WDR may store instructions and/or data to be provided to the circuits and/or received from the circuits. The memory device may also include an cryptographic circuit. In some embodiments, the cryptographic circuit may include a decryption circuit and as part of a write operation to the WDR, the decryption circuit may receive the encrypted portion of the information along the interface bus and then decrypt it before it is stored in the secure WDR. In some embodiments, the cryptographic circuit may include an encryption circuit and as part of a read operation from the WDR, the encryption circuit may receive information from the secure WDR and then encrypt it before providing it along the interface bus. In some embodiments, the cryptographic circuit may include both a decryption circuit and an encryption circuit.

Figure 1:
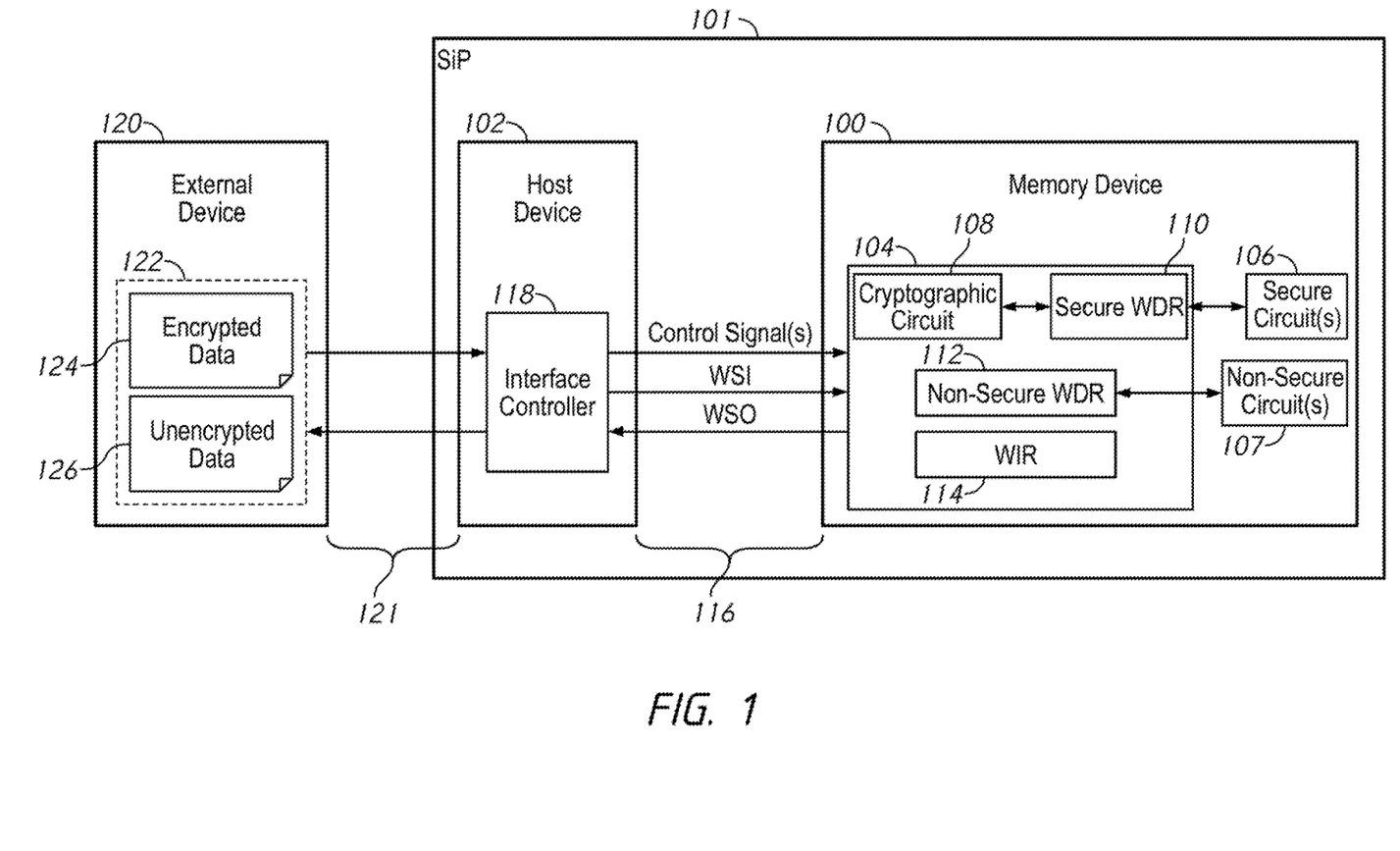
FIG. 1 is a block diagram of a memory system according to an embodiment of the present disclosure.

FIG. 1 is a block diagram of a memory system according to an embodiment of the present disclosure. The memory system includes a system-in-package (SiP) 101 which includes a memory device 100 and a host device 102. The memory device 100 is coupled to the host device 102 along an interface bus 116. The memory device 100 includes wrapper data register (WDR) circuit 104. The WDR circuit 104 includes a secure WDR 110 coupled to a cryptographic circuit 108, a non-secure WDR 112, and a wrapper instruction register (WIR) 114. The secure WDR 110 and the non-secure WDR 112 receives and sends information along the interface bus 116. The interface bus 116 includes an input bus WSI, and an output bus WSO. One or more control signals may also be provided along the interface bus 116 to the WIR 114 to control whether information along the interface is routed to/from the secure WDR 110 or the non-secure WDR 112.

The memory device 100 may provide memory storage for the host device 102. For example, the SiP 101 may be a computing device such as a motherboard or a graphics card, the host device may be a processor (e.g., a CPU or GPU) and the HBM may provide on-board memory which is used by the SiP 101. The memory device 100 may be designed and/or manufactured by a first entity (e.g., a first company, a first organization, etc.), which may generally be referred to as the memory entity. The host device 102 may be designed and/or manufactured by a second entity (e.g., a second company), which may generally be referred to as the host entity. The information provided to, and/or received from, the secure circuit 106 may be encrypted outside the memory device 100 such that the encrypted information is insensible to the host organization but may be decrypted and understood by the memory organization.

For example, the memory entity may be a company which designs the memory device 100, while the host entity may be a company which packages the memory device 100 and the host device 102 together into the SiP 101. In general, the term memory entity is used to represent an entity which is allowed access to the unencrypted meaning of the information sent to/received from the secure circuit 106, while the host entity represents an entity which is not allowed that access. For example, the secure circuit may represent a test circuit, which a designer of the memory device 100 may want to keep the details secret from a host entity which is a customer of the memory devices and packages the memory device 100 onto the SiP 101. Accordingly, the memory entity may want to keep the information sent to the test circuit (or the information the test circuit provides) encrypted when that information passes along the interface bus 116 in order to prevent the host entity from being able to interpret the contents of that information.

It should be noted that the terms memory entity and host entity are used for ease of reference, and that many different relationships may exist between the memory and host entities. For example, in some embodiments the memory entity may be a vendor which sells the memory device to the host entity (which is therefore a customer). In some embodiments, the memory and the host entities may represent different parts of the same organization (e.g., different departments, different facilities, etc.). In some embodiments, the memory and host entities may each represent multiple different entities. For example the host entity may include an entity which designs the host device 102, an entity which manufactures the host device 102, an entity which packages the host device 102 and memory device 100 into a SiP 101, etc.

The WDR circuit 104 may include a number of registers, such as the secure WDR 110, non-secure WDR 112, and WIR 114. The registers may store information (e.g., in one or more latch circuits). The control signal(s) may be used, in part, to control which of the registers information along the interface bus 116 is sent to or received from. In some embodiments, the control signal may cause information along the input bus WSI to be written to the WIR 114 and the state of the information stored in the WIR 114 may determine if subsequent information along the interface bus 116 is stored in the secure WDR 110 or the non-secure WDR 112 as part of a write operation. The state of the information stored in the WIR 114 may also determine if information is read out from the secure WDR 110 or the non-secure WDR 112 as part of a read operation.

The two WDR circuits 110 and 112 may store information which is associated with the secure circuit(s) 106 and non-secure circuit(s) 107 respectively. The secure and non-secure circuits 106 and 107 may be able to access the information in their respective WDRs 110 and 112. For example, the circuits 106 and 107 may be able to read information in their respective WDR 112 or 114, and may be able to write new information to their respective WDR 112 or 114.

The cryptographic circuit 108 may include a decryption circuit and/or an encryption circuit. The decryption circuit may receive encrypted information along the input bus WSI and then decrypt that information before it is stored in the secure WDR 110. Accordingly, encrypted information sent to the secure WDR 110 may be stored in the secure WDR 110 as unencrypted information. The encryption circuit may receive unencrypted information stored in the secure WDR 110 and encrypt it before it is provided along the output bus WSO. Accordingly, if the cryptographic circuit 108 includes both an encryption and decryption circuit, information provided to and received from the secure WDR 110 may be encrypted outside of the WDR circuit 104.

In an example operation where the secure circuit 106 is a test circuit of the memory device 100, instructions for the operation of a test may be received along the input bus WSI, decrypted by a decryption circuit of the cryptographic circuit 108 and then written to the secure WDR 110. The secure circuit 106 may then read that information out of the secure WDR 110 and use it to perform the test on the memory device 100. After the test is performed, the secure circuit 106 may write information (e.g., results of the test) back to the secure WDR 110. That information may then be read out from the secure WDR 110, encrypted by an encryption circuit of the cryptographic circuit 108 and then provided along the output bus WSO. Information may also be written to the non-secure WDR 112, used by the non-secure circuit 107, and then read from the non-secure WDR 112 in a similar fashion, but without being decrypted/encrypted. In this manner, information along the interface bus 116 may be used to operate the secure circuits 106 and non-secure circuits 107, and information from the secure and non-secure circuits 106 and 107 may be read out along the interface bus 116.

An interface controller 118 of the host device 102 may control the flow of information along the interface bus 116. In some embodiments, the interface bus 116 may be an IEEE 1500 interface, and the interface controller 118 may be an IEEE 1500 controller. The interface controller 118 may provide input information (e.g., values to write to the WDR circuit 104) along the input bus WSI, receive information from the WDR circuit 108 along the output bus WSO and provide one or more control signals. The control signals may include clock signals which control the timing at which information is written to or read from the WDR circuit 104. The control signals may include a select signal which determines if information is written to (or read from) the secure WDR 110, the non-secure WDR 112, and/or the WIR 114. In some embodiments, there may be separate select signals for each of the secure WDR 110, the non-secure WDR 112, and the WIR 114. In some embodiments, there may be a single select signal for the WIR 114 provided along the interface bus 116 and the select signals for the secure and non-secure WDR 110 and 112 may be generated internally to the WDR circuit 104 based on the state of the WIR 114.

In some embodiments where the cryptographic circuit 108 includes a decryption circuit, when the interface controller 118 writes information to the secure WDR 110 one or more of the control signals may activate the cryptographic circuit 108. The activated cryptographic circuit 108 may receive information along the input bus WSI, and may decrypt the received information and then provide the decrypted information to the secure WDR 110. For example the written information may be test instructions. When the interface controller 118 writes information to the non-secure 112, the cryptographic circuit 108 may remain inactive, and the information along the input bus WSI may be written to the non-secure WDR 112 as-is.

The information stored in the secure WDR 106 may be read by the secure circuits 106 which may perform one or more functions based on the state of the information in the secure WDR. For example, in some embodiments the secure WDR may store information which may be interpreted by the secure circuits 106. The secure circuits 106 may then write information into the secure WDR 110. For example, results may be written into the secure WDR 110. In some embodiments the results may overwrite the instructions previously stored in the secure WDR 110. In some embodiments, there may be separate input and output regions of the secure WDR 110. The non-secure WDR 112 may be read by (and written to) the non-secure circuits 107 in a manner generally analogous to the secure WDR 110.

In some embodiments where the cryptographic circuit 108 includes an encryption circuit, when the interface controller 118 indicates that information should be read from the secure WDR 110 (e.g., by providing appropriate signals to the WIR 114), the cryptographic circuit 108 may be activated, and may receive information from the secure WDR 110 and then encrypt it before providing it along the output bus WSO. When the interface controller 118 indicates that information should be read from the non-secure WDR 112, the cryptographic circuit 108 may remain inactive, and the information may be read directly from the non-secure WDR 112 to the output bus WSO.

In some embodiments, the host device 102 may be coupled to an external device 120 along a second interface bus 121. The second interface bus 121, may, in some embodiments, be a JTAG interface. The information which is written to or read from the WDR circuit 104 may, in some embodiments, be received from/sent to the external device 120. The external device 102 may operate the secure circuit (s) 106 and/or the non-secure circuit(s) 107 in the memory device 100 through the host device 102 along the second interface bus 121 and the interface bus 116. For example, if the SiP 101 is a graphics card or a motherboard, then the external device 120 may be a computer, such as a personal computer, coupled to the SiP 101. In some embodiments, the external device 120 may be a tester unit used to perform one or more tests on the memory device 100. In such an embodiment, one or more of the secure circuits 106 may be built-in self-test (BIST) circuits which may be operated by the external device 120. In some embodiments, the external device 120 may be a separate device coupled to the host device 102. In some embodiments, the external device 120 may be integral to the SiP 101. In some embodiments, the external device 120 (and the second interface 121) may be omitted, and the host device 102 may directly perform the functions attributed to the external device 120. For example, in some embodiments, the host device 102 may operate the BIST circuits itself.

The external device 120 may store information 122 which is provided to, and/or received from, the secure circuit(s) 106 and non-secure circuit(s) 107 in the memory device 100. The information 122 may include a mix of encrypted information 124 and unencrypted information 126. The encrypted information 124 may include information which is used to operate the secure circuit 106 in the memory device 100 (e.g., control information for operating a test circuit, test data to write to one or more memory cells, etc.). The encrypted information 124 may also include information which is received from the secure circuit 106 (e.g., a results file of result data from the test circuit, test data read from one or more memory cells, etc.). The unencrypted information 126 may include information which is sent to and/or received from the non-secure circuit(s) 107 of the memory device 100. The encrypted information 124 may be encrypted, such that the meaning of the encrypted information 124 may not be extracted without knowledge of how the encrypted information was encrypted. If the encrypted information is being written to the secure WDR 110, then the information may be pre-encrypted (e.g., by the memory organization) before it is provided to the external device 120 and then decrypted by the cryptographic circuit 108 when it is written to the secure WDR 110. If the encrypted information is received from the secure WDR 110, then the information may be encrypted by the cryptographic circuit 108.

Figure 2:
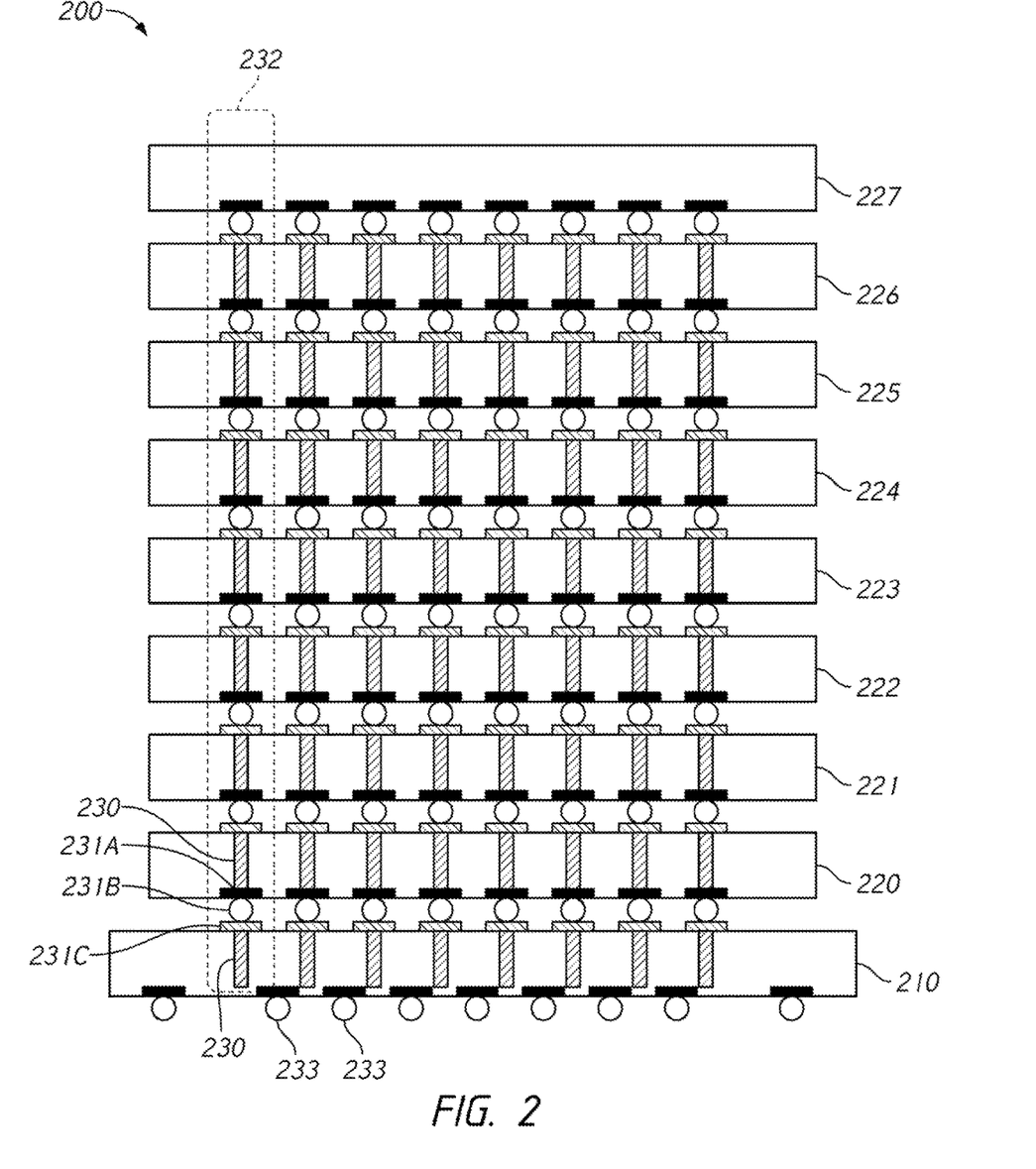
FIG. 2 is a cross-sectional view of a high bandwidth memory according to an embodiment of the present disclosure.

FIG. 2 is a cross-sectional view of a high bandwidth memory according to an embodiment of the present disclosure. The high bandwidth memory (HBM) 200 of FIG. 2 may, in some embodiments, be included in the memory device 100 of FIG. 1. The HBM 200 of FIG. 2 is an HBM having a structure in which eight memory core chips 220 to 227 are stacked one on top of another on an interface chip 210. However, embodiments of the present disclosure are not limited to the HBM, and other structures of memory (or other semiconductor devices) may be used in other embodiments. The memory core chips 220 to 227 are semiconductor chips, each of which a memory core including a memory cell array is integrated. The interface chip 210 is a semiconductor chip that controls the memory core chips 220 to 227.

The interface chip 210 may be coupled to a host device (e.g., host device 102) along an interposer, which may contain one more channels which act as a bus between the host device and memory device (e.g., interface bus 116). The interface chip 210 may receive information from the interface bus at one or more external terminals 233, and the interface chip 210 may then distribute the received information to one or more of the memory core chips 220 to 227. Similarly, the interface chip 210 may receive information from the memory core chips 220 to 227 and then provide that information at the external terminals (e.g., along an interface such as interface bus 116). The WDR circuits of FIG. 1 (and the secure and non-secure circuits) may be located in the interface chip 210.

Each of the interface chip 210 and the memory core chips 220 to 226 includes a plurality of TSVs 230 that penetrate through the corresponding semiconductor substrate. The interface chip 210 and the memory core chips 220 to 227 are all stacked by a face-down method, that is, in such a manner that principal surfaces on which transistors and wiring patterns (all not shown) are formed face downward. Accordingly, the memory core chip 227 located in the topmost layer does not need the TSVs 230. However, in some embodiments of the disclosure, the memory core chip 227 located in the topmost layer may include the TSVs 230. Most of the TSVs 230 provided on the memory core chips 220 to 226 are connected to front TSV pads 231A located at same planar positions, respectively. In contrast thereto, most of the TSVs 230 provided on the interface chip 210 and the front TSV pads 231A provided on the interface chip 210 are located at different planar positions. The TSVs 230 located at the same planar positions among the TSVs 230 provided on the interface chip 210 and the memory core chips 220 to 226 are cascade connected via the front TSV pads 231A, TSV bumps 231B, and back TSV pads 231C, respectively, so that a plurality of signal paths 232 are formed. Commands and write information output from the interface chip 210 are supplied to the memory core chips 220 to 227 via the signal paths 232. Read information output from the memory core chips 220 to 227 are supplied to the interface chip 210 via the signal paths 232. External terminals 233 are provided on the interface chip 210 and transmission/reception of signals to/from an external circuit is performed via the external terminals 233.

Figure 3:
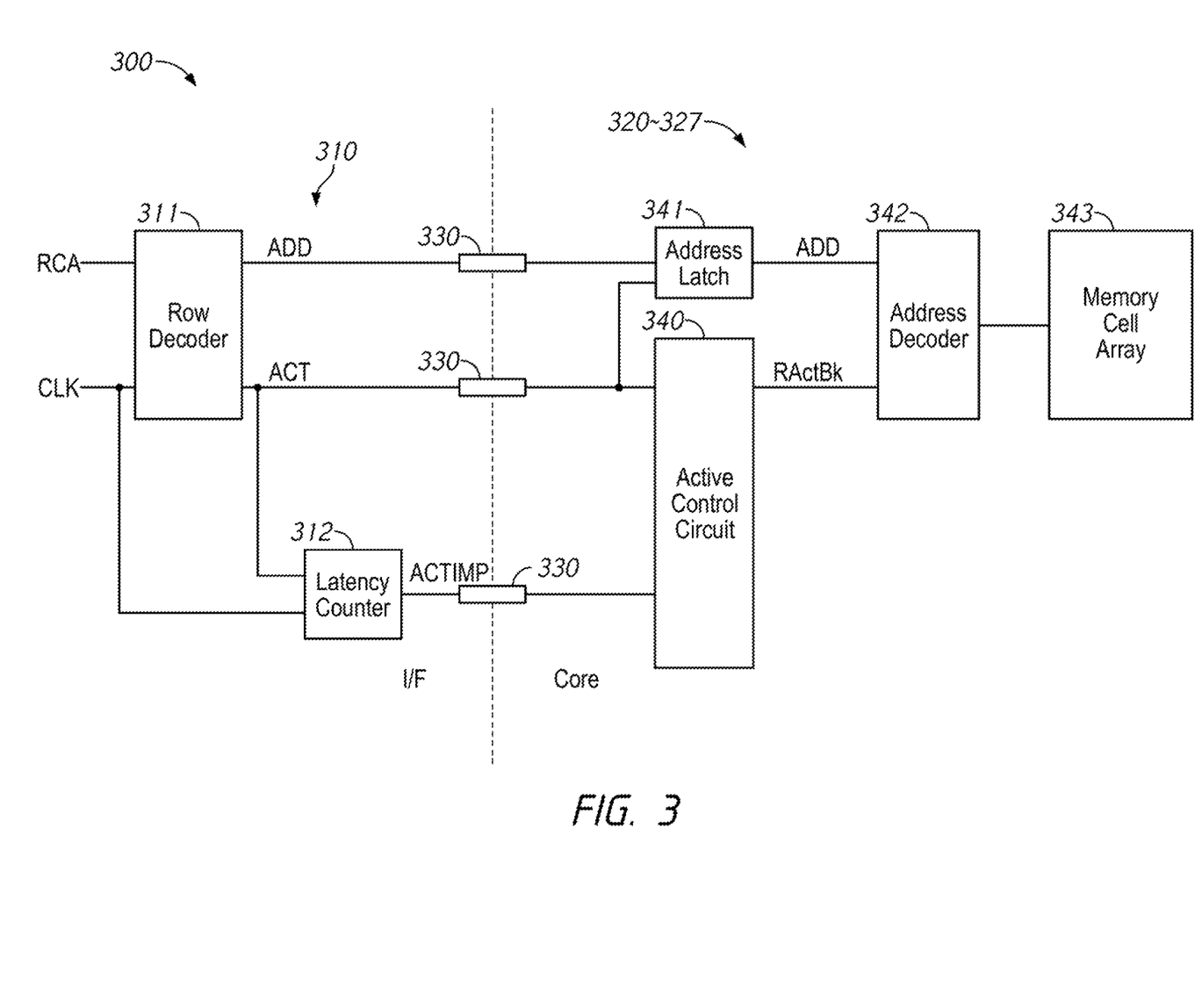
FIG. 3 is a block diagram of a high bandwidth memory according to an embodiment of the present disclosure.

FIG. 3 is a block diagram of a high bandwidth memory according to an embodiment of the present disclosure. The high bandwidth memory 300 of FIG. 3 may, in some embodiments, be included in the high bandwidth memory 100 of FIGS. 1 and/or 200 of FIG. 2. FIG. 3 shows an example of how standard memory operations may be performed between an interface chip 310 and one or more core chips 320-327. For clarity of illustration, the WDR circuit (e.g., WDR circuit 104 of FIG. 1) is not shown in FIG. 3. A WDR circuit and its operation is discussed in more detail in FIGS. 4-7.

As shown in FIG. 3, the interface chip 310 includes a row decoder 311 and a latency counter 312. The row decoder 311 receives a command address signal RCA and a clock signal CLK and generates an address signal ADD and an internal command. One type of the internal command is an active command ACT. The active command ACT is supplied to the memory core chips 320 to 327 via the TSVs 330 and is supplied also to the latency counter 312. The address signal ADD is also supplied to the memory core chips 320 to 327 via the TSVs 330. The latency counter 312 receives the active command ACT and the clock signal CLK. The latency counter 312 generates an internal command ACTIMP after a predetermined cycle of the clock signal CLK is elapsed from activation of the active command ACT. The internal command ACTIMP is supplied to the memory core chips 320 to 327 via different TSVs 30.

Each of the memory core chips 320 to 327 includes an active control circuit 340, an address latch circuit 341, an address decoder 342, and a memory cell array 343. The active control circuit 340 receives the active command ACT and the internal command ACTIMP and generates a state signal RActBk. The state signal RActBk is a signal indicating the state of the memory cell array 343. For example, the state signal RActBk is at a high level when the memory cell array 343 is in an active state while being at a low level when the memory cell array 343 is in an inactive state (a precharge state). The state signal RActBk is supplied to the address decoder 342 along with the address signal ADD latched by the address latch circuit 341. The address decoder 342 decodes the address signal ADD and performs a row access to the memory cell array 343. The memory cell array 343 may be divided into a plurality of memory banks. In this case, the active control circuit 340 is allocated to each of the memory banks.

In an example operation, the WDR circuit 104 of FIG. 1, along with the secure circuit 106 and non-secure circuit 107 may be located in the interface die 310 of the HBM device 300. The secure circuit 106 may be a built-in self-test (BIST circuit) which may be used to test one or more memory cells in the memory cell array 343. The interface bus which couples the host device (e.g., a processor) to the HBM device 300 may be a IEEE 1500 interface bus. The host device may provide test instructions (e.g., address information ADD for memory cells to be tested) and test data, a sequence of data to be written to the specified memory cells. The provided test instructions and test data may be encrypted. The host device may provide select signals which indicate that the test instructions and data are encrypted, and should be written to the secure WDR. A cryptographic circuit located in the interface die 310 may receive the encrypted information, decrypt them, and store them in the secure WDR. The BIST circuit may access the test instructions, and based on those test instructions provide the test data to the memory cells of the memory array 343 in one or more of the core dies 320-327 based on the test instructions. The BIST circuit may then read the test data from the memory cells and compare the read test data to the written test data. The BIST circuit may then write results information to the secure WDR. The host device may retrieve the results information by sending select signals to the interface die 310. The cryptographic circuit may encrypt the results information and then provide that results information along an interface bus to the host device.

Figure 4:
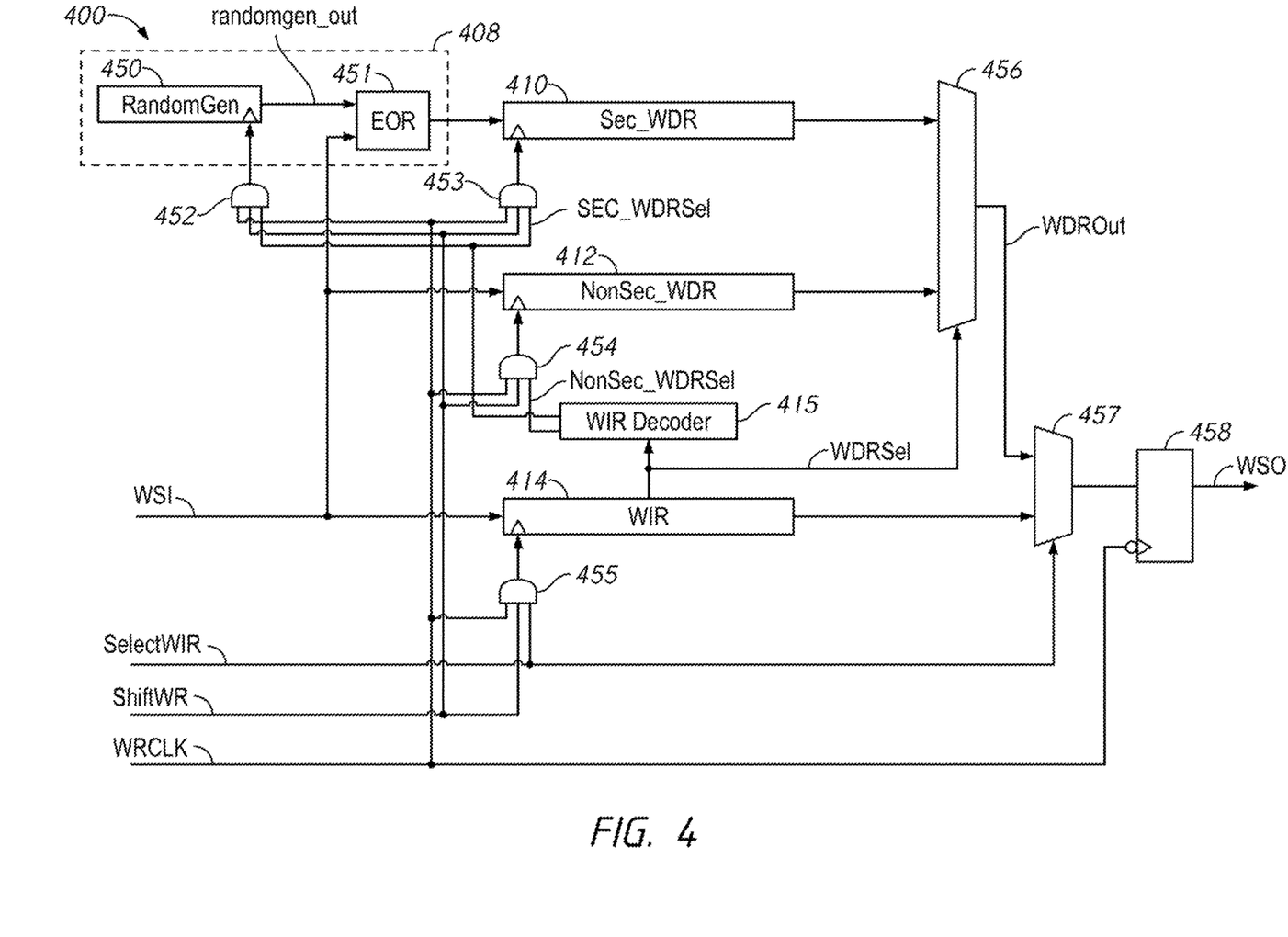
FIG. 4 is a schematic diagram of a wrapper data register circuit according to an embodiment of the present disclosure.

FIG. 4 is a schematic diagram of a WDR circuit according to an embodiment of the present disclosure. The WDR circuit 400 may, in some embodiments, be included in the WDR circuit 104 of FIG. 1. The WDR circuit 400 includes a secure WDR 410, here labelled Sec_WDR, and a non-secure WDR 412, here labelled NonSec_WDR. These may, in some embodiments, be included in the secure WDR 110 and non-secure WDR 112 of FIG. 1. The WDR circuit 400 includes a WIR 414, which may, in some embodiments, be included in the WIR 114 of FIG. 1.

In the particular embodiment of FIG. 4, a WDR circuit 400 includes a cryptographic circuit 408. In particular, the cryptographic circuit 408 is a decryption circuit which include a random number generator 450 and an exclusive OR (EOR) gate 451. The random number generator 450 and the EOR gate 451 are used to receive encrypted information along the input bus WSI and decrypt the encrypted information before writing it to the secure WDR 410 as part of a write operation to the secure WDR 410 by a host device (e.g., 102 of FIG. 1).

The WDR circuit 400 is coupled to a host device along a bus (e.g., of the interface bus 116 of FIG. 1) which includes an input bus WSI, an output bus WSO and a number of control signals such as SelectWIR, ShiftWR, and WRCLK. The signal SelectWIR may be used to activate the WIR 414, such that information along the input bus WSI may be written to the WIR 414 and/or so that information in the WIR 414 may be written to the output bus WSO. The signal ShiftWR controls the loading and/or unloading of bits of information into the registers, such as the secure WDR 410, non-secure WDR 412 and WIR 414. The signal WRCLK may be a clock signal which controls the timing with which information is handled in the WDR circuit 400.

In the example embodiment of the WDR circuit 400, a signal (e.g., SelectWIR and ShiftWR) may generally be considered 'active' when it is at a high logical level, and inactive when it is at a low logical level. Signals or buses which carry binary data (e.g., WSI, WSO) may generally use a high logical level to represent a 1 of a binary signal and a low logical level to represent a 0 of the binary signal. The clock signal WRCLK may have a rising edge (where a low logical level transitions to a high logical level) or a falling edge (where a high logical level falls to a low logical level). In some embodiments, one type of edge (e.g., a rising edge) may be used to control the timing of write operations, while the other type of edge (e.g., a falling edge) may be used to control the timing of read operations. In general, the WDR circuit 400 may use a first voltage (e.g., a ground voltage) to represent a low logical level, and a second voltage (e.g., a system voltage higher than the ground voltage) to represent a high logical level. It should be understood that in other embodiments, other waveforms may be used to mark activations of the signals, and that other systems may be used to distinguish logical levels of signals.

In some embodiments of the disclosure, the WIR 414, the secure WDR 410, and the non-secure WDR 412 may all be shift registers. Each may include a number of latch circuits which are coupled together in series to each other. Each of the latch circuits is capable of storing a logical state representing a stored bit. In some embodiments, the shift registers may operate in a first-in, first-out (FIFO) fashion. For example during a write operation to the shift register, the shift register may be activated (e.g., by signals from the WIR 414 as discussed herein). Each time rising edge of the clock signal WRCLK is received, the activated shift register may shift the value in each latch circuit to a next latch circuit in the series and may store the current logical level on the input bus WSI in the first latch circuit. When a shift register is read, responsive to each falling edge of the clock signal WRCLK, a value stored in the last latch circuit may be used to set a state of the output bus WSO and may be removed from that latch circuit. Each value may then be shifted to the next latch circuit, so the value in the next-to-last latch circuit is loaded in the last latch circuit, etc.

The WIR 414 may be used to store information which is used to control whether the non-secure WDR 412 or the secure WDR 410 (and random number generator 450) are active. The WIR 414 has a clock terminal which is coupled to the output terminal of an AND gate 455. The AND gate 455 has input terminals coupled to the signals SelectWIR, ShiftWR, and WRCLK. The WIR 414 has an input terminal coupled to the input bus WSI. Accordingly, when SelectWIR and ShiftWR are both active, the AND gate 455 may pass the clock signal WRCLK to the clock terminal of the WIR 414, which in turn may cause the WIR to load the current state of the input bus WSI. The state of the bits stored in the WIR 414 may be used to generate signals which activate the secure WDR 410 and non-secure WDR 412.

The WIR 414 may be coupled to a WIR decoder circuit 415. The WIR decoder circuit 415 reads the state of the bits stored in the WIR 414 and provides the selector signals SEC_WDRSel and NonSec_WDRSel. The signal SEC_WDRSel may be used to activate the secure WDR 410 and the random number generator 450. The signal NonSec_WDRSel may be used to activate the non-secure WDR 412. The WIR 414 may also provide a signal WDRSel which is used, in part, to select whether the secure WDR 410 or the non-secure WDR 412 provides information to the output bus WSO. In some embodiments, the signal WDRSel may be provided by the WIR 414 directly. In some embodiments, the signal WDRSel may be provided by the WIR decoder circuit 415.

The non-secure WDR 412 has an input terminal coupled to the input bus WSI and a clock terminal coupled to the output of an AND gate 454. The AND gate 454 has input terminals that are provided the signals NonSec_WDRSel, ShiftWR and the clock signal WRCLK. Accordingly, when the signals NonSec_WDRSel and ShiftWR are active to the AND gate 454 may provide the clock signal WRCLK to the clock terminal of the non-secure WDR 412. When an activation (e.g., a rising edge) of the clock signal WRCLK is received at the clock terminal of the non-secure WDR 412, the non-secure WDR 412 may shift the information in the registers and store the current state of the input bus WSI in the first register.

The secure WDR 410 is generally similar to the non-secure WDR 412, and for the sake of brevity, similar features will not be repeated. The secure WDR 410 has a clock terminal which is coupled to the output terminal of an AND gate 453. The input terminals of the AND gate 453 are provided the signals ShiftWR, SEC_WDRSel, and WRCLK. Accordingly, when the signals SEC_WDRSel and ShiftWR are active, the clock signal WRCLK may be passed from the AND gate 452 to the clock terminal of the secure WDR 410 and the clock terminal of the random number generator 450.

The input terminal of the secure WDR 410 is coupled to an output of the cryptography circuit 408. The random number generator 450 has a clock terminal which is coupled to the output terminal of an AND gate 452. The AND gate 452 has input terminals coupled to the signals ShiftWR, SEC_WDRSel, and WRCLK. Similar to the secure WDR 410, when the signals ShiftWR and SEC_WDRSel are active, the clock signal WRCLK is passed to the clock terminal of the random number generator 450.

Each time an activation is received at the clock terminal of the random number generator 450, the random number generator 450 may provide a value of a signal randomgen_out. The signal randomgen_out may be a binary signal which is either at a high logical level or a low logical level (e.g., either a 1 or 0). The random number generator 450 may provide the signal randomgen_out with behavior which is known to the vendor organization but not known to the customer organization. In some embodiments, the random number generator 450 may provide the value of the signal randomgen_out with behavior over time which is difficult to predict without knowledge of the details of the operation of the random number generator 450. For example, the pattern of the signal randomgen_out over time may appear to have the characteristics of randomness.

The signal randomgen_out is provided to an input terminal of an EOR gate 451, while the input bus WSI is coupled to the other input terminal of the EOR gate 451. The output terminal of the EOR gate 451 is coupled to the input terminal of the secure WDR 410. If the value on the input bus WSA matches the value of randomgen_out, then a low logic level is provided to the input of the secure WDR 410, and if the value of WSI and randomgen_out do not match, then a high value is provided to the input of the secure WDR 410. Accordingly, when the signals SEC_WDRSel and SelectWIR are active, with each activation of the clock signal WRCLK, a new value of randomgen_out is generated, combined with the input value WSI and then stored in the secure WDR 410.

When information is written to the secure WDR 410, the values input along in the input bus WSI may previously have been encrypted based on knowledge of the behavior of the random number generator 450. Accordingly, the random number generator 450 and EOR gate 451 may work together to decrypt the information along the input bus WSI before the decrypted data is stored in the secure WDR 410.

During a read operation of the WDR circuit 400, information may be read out from the shift registers such as the secure WDR 410, the non-secure WDR 412, and/or the WIR 414 to the output bus WSO. During a read organization, when one of the shift registers is activated and receives a signal at the clock terminal, data is read out from the register to an output terminal. The selection of the shift register using the signals SEC_WDRSel, NonSec_WDRSel, and SelectWIR may generally be similar to the selection during a write operation.

A latch circuit 458 has an input terminal coupled to the output of a multiplexer 457, and a clock terminal coupled to the clock signal WRCLK. The value stored in the latch circuit 458 may be provided along the output bus WSO. The multiplexer 457 has an input terminal coupled to the output terminal of the WIR 414 and an input terminal coupled to the signal WDROut. The selector terminal of the multiplexer 457 is coupled to the signal SelectWIR. Accordingly, when the signal SelectWIR is at a high level, the multiplexer 457 provides the output signal from the WIR 414 to the latch 458 and when the signal SelectWIR is at a low level, the signal WDROut is provided to the latch 458.

The signal WDROut represents the output of one of the two WDRs 410 or 412, and which one is determined by the signal WDRSel. The signal WDROut is provided by the output terminal of a multiplexer 456 which has input terminals coupled to the output terminals of the secure WDR 410 and the non-secure WDR 412. The signal WDRSel is coupled to the selection terminal of the multiplexer 456.

Responsive to an activation of the clock signal WRCLK, the latch circuit 458 may latch the current value being provided to its input terminal (e.g., the value provided by the multiplexer 457). That latched value may be provided as the value along the output bus WSO until the next activation of a clock signal causes the latch circuit 458 to latch a new value.

Figure 5:
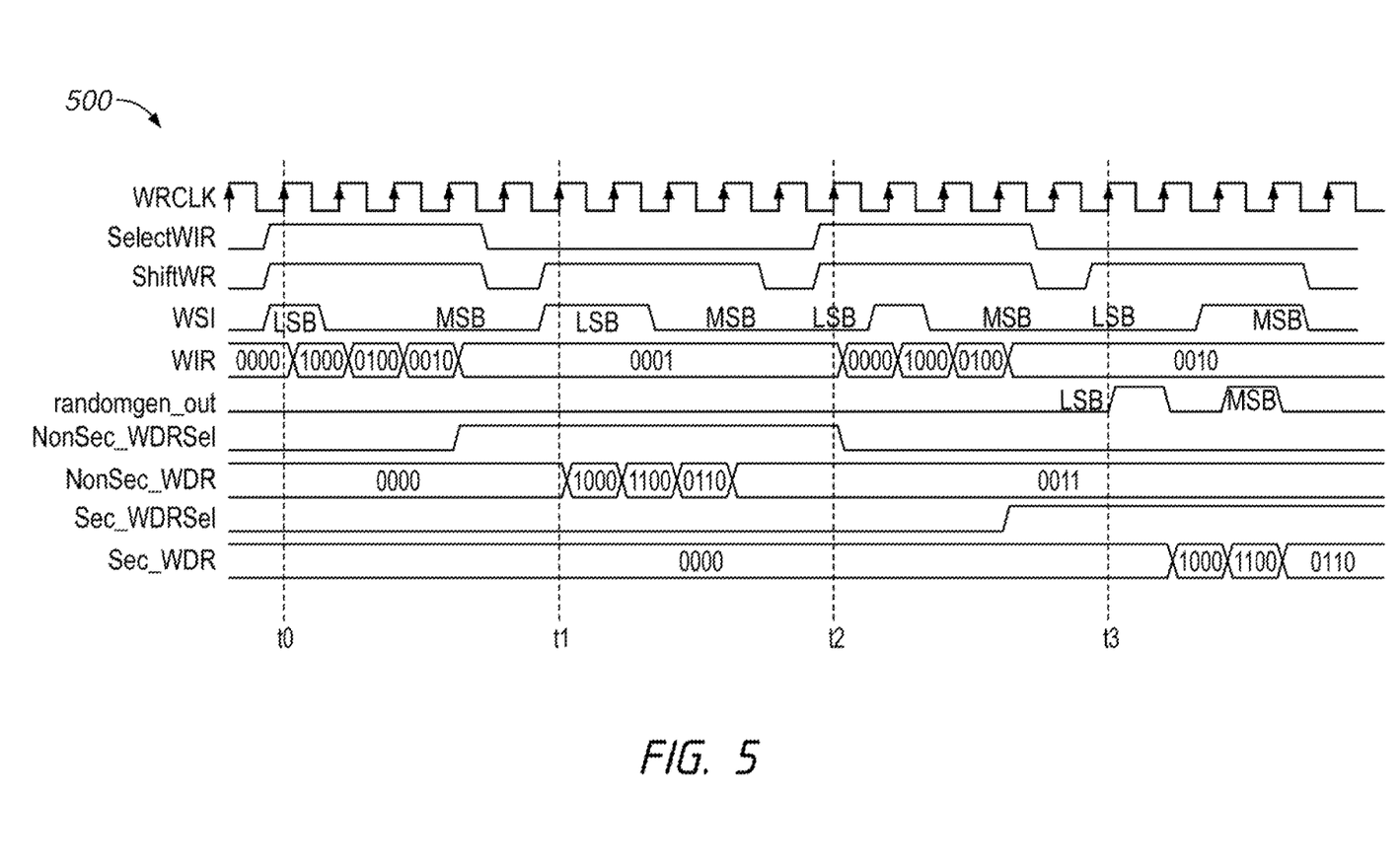
FIG. 5 is a timing diagram of the operation of a wrapper data register circuit according to an embodiment of the present disclosure.

FIG. 5 is a timing diagram of the operation of a WDR circuit according to an embodiment of the present disclosure. The timing diagram 500 may, in some embodiments, represent the operation of a WDR circuit, such as the WDR circuit 400 of FIG. 4 (and/or 104 of FIG. 1). The timing diagram 500 shows a number of different signals (along with the states of shift registers such as WIR, a secure WDR, and non-secure WDR) along a common time axis, extending along the horizontal axis.

The timing diagram 500 includes the clock signal WRCLK. The clock signal WRCLK is a periodic signal which may be linked to one or more other clock signals of the device (e.g., a clock signal of the HBM 100 and/or host device 102). In the example embodiment of FIG. 5, the clock signal WRCLK alternates between a high and low logical level with regular timing.

The timing diagram 500 further includes the signal SelectWIR which is used to activate the WIR (e.g., WIR 414 of FIG. 4). When the signal SelectWIR is active (e.g., at a high logical level), the state of the bits on the input bus WSI may be written onto the WIR. In the embodiment of FIG. 5, the WIR, the secure WDR, and the non-secure WDR may be, for example, shift registers which include four individual registers. Accordingly, the signal SelectWIR may be active for four rising edges of the clock signal WRCLK.

The timing diagram 500 further includes the register signal ShiftWR. When the signal ShiftWR is at a high level, one of the shift registers may be activated. Similar to the signal SelectWIR, the signal ShiftWR may be at a high level for four rising clock edges in order to allow four bits to be written to a shift register. The signal ShiftWR may be at a high logical level for four rising edges of the signal WRCLK, and then may at a low logical level for one rising edge of WRCLK.

The timing diagram 500 further includes the value along the input bus WSI. The signal line WSI is marked with LSB (for least significant bit) at the left side of each activation of ShiftWR, and MSB (for most significant bit) at the right side of each activation of ShiftWR. These are meant for illustrative purposes only, to show how the data is loaded into a shift register.

The timing diagram 500 further includes the value of the bits stored in the WIR. Each box represents the state of the four bits stored in the registers of the WIR from most significant bit to least significant bit.

The timing diagram 500 further includes the random number randomgen_out. The seventh signal of the timing diagram 500 is the non-secure select signal NonSec_WDRSel. The eighth signal is the value of the bits stored in the non-secure WDR. The ninth signal is the secure select signal Sec_WDRSel and the tenth signal is the value of the bits stored in the secure WDR.

At an initial time t0, information may be written into the WIR. Accordingly, the SelectWIR signal may be at a high level (along with ShiftWR). At a first rising edge of the clock signal WRCLK, the current value on the WSI is written to the WIR. Since the signal on WSI is a high logical level, a logical high may be written to the WIR, making the overall value 1000. At the next rising edge of the clock signal, the previously stored 1 may be moved over, and the current value of WSI (a low logical level) may be written to yield 0100. The next rising edge also loads a low logical level on WSI to yield 0010, and the fourth clock signal adds another 0 to yield 0001.

At a time t1, data may be provided along the input bus WSI which is to be written one of the WDRs. The value 0001 may indicate that the non-secure WDR should be active. Accordingly, when the value 0001 was stored in the WIR, the signal NonSec_WDRSel may rise to a high logical level. At the time t1, the signal ShiftWR may be active again. Since the signal NonSec_WDRSel is at a high level (and since SelectWIR is low) the values on the input bus WSI may be written to the non-secure WDR. From first to last clock pulse, the values of the WSI may be a 1, a 1, a 0, and a 0. Accordingly the state of the non-secure WDR may change from 0000 to 1000 to 1100 to 0110 to 0011.

At a time t2, the WIR may be activated again and may be loaded with new information. At each of the four rising clock edges, the value of the input bus is 0, 1, 0, then 0. Accordingly, the state of the WIR may change to 0000 (as the previously stored 1 in the least significate bit is 'pushed out' by the first 0), then 1000, then 0100, then 0010. The value of 0010 stored in the WIR may indicate that the secure WDR and the random number generator should be activated. Accordingly, once 0010 is loaded in the WIR the signal Sec_WDR may rise to a high logical level.

At a time t3, the signals ShiftWR and Sec_WDR are both active. At a first rising clock edge (shown by the vertical arrow), the value along the WSI is a 0, and the value of randomgen_out is also a 0. Accordingly a 0 is written to Sec_WDR (e.g., the EOR of 0 and 0 is 0), keeping the overall value of 0000. Next, the value of WSI is 0 and randomgen_out is a 1, and accordingly a 1 is written to Sec_WDR to change the overall value to 1000. Next the value of WSI is 1, while the value of randomgen_out is 0, so another 1 is written to Sec_WDR to change the overall value to 1100. Finally, the value of WSI and randomgen_out is a 1, and so a 0 is written o Sec_WDR to give a final value of 0110.

As may be seen, in order to write the value 0011 to the non-secure WDR, the plain-text values 1, 1, 0, and 0 are provided along the input bus WSI (in backwards order from LSB to MSB due to the operation of the shift registers). In order to write the value 0110 to the secure WDR, then encrypted values 0, 0, 1, and 1 are written to the WSI. Accordingly, without knowledge of the sequence of values of randomgen_out, it may not be possible to determine the decrypted value 0110 from the sequence of encrypted values 0, 0, 1, and 1 along WSI.

The encrypted information may be stored in a data file (e.g., the information 122 of FIG. 1) and provided along the interface to the secure WDR. The data may be previously encrypted based on knowledge of the operation of the cryptographic circuit 408 (e.g., knowledge of the sequence of bits provided by the random number generator circuit). In some embodiments, a vendor organization may determine the plain-text value to write to the secure WDR (e.g., 0110) and may then generate an encrypted input data which is provided to the customer organization to load to the HBM device. In this manner, the customer organization may only have knowledge of the encrypted information, and may not be able to determine the values which are actually written to the secure WDR.

Figure 6:
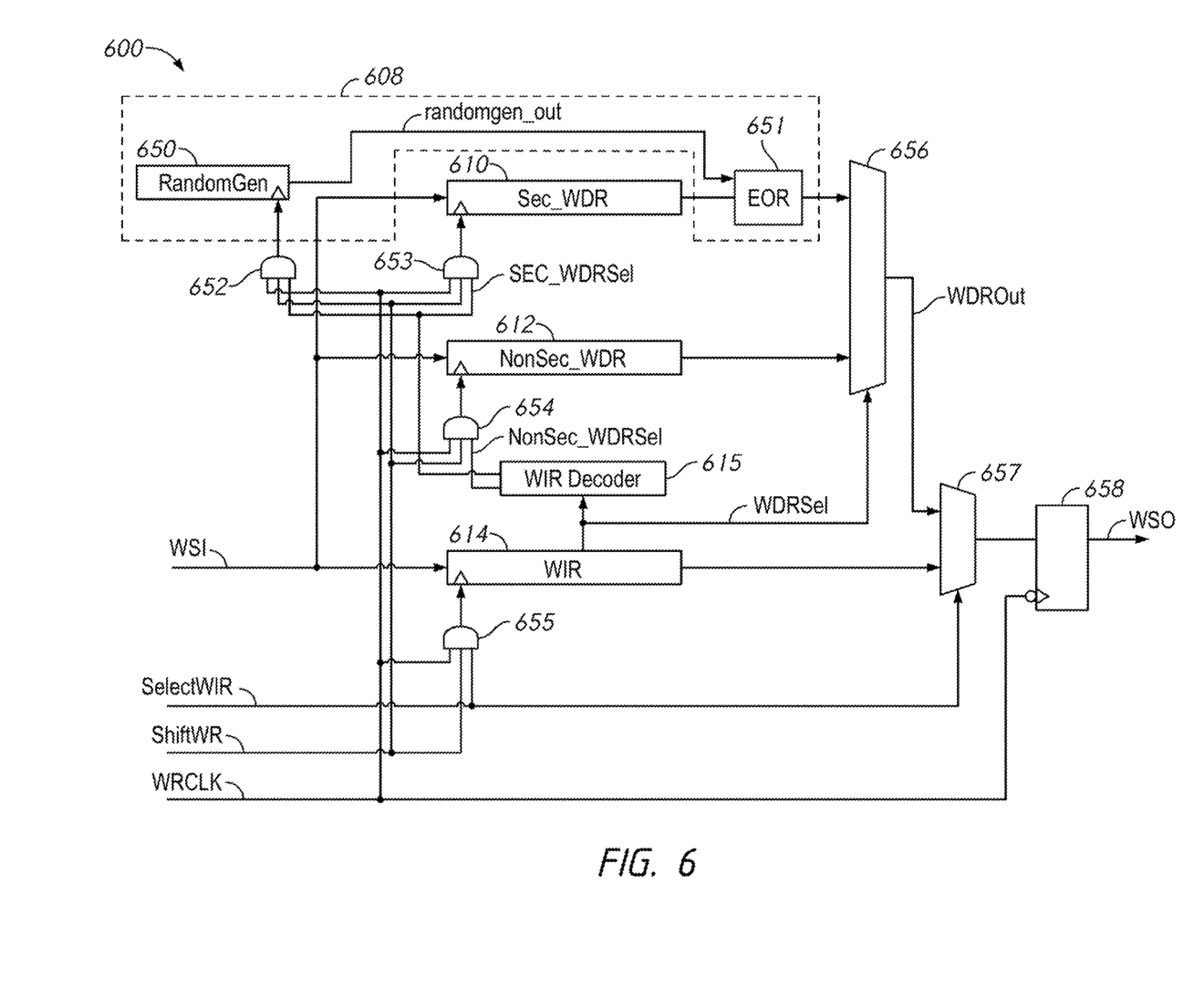
FIG. 6 is a schematic diagram of a wrapper data register circuit according to an embodiment of the present disclosure.

FIG. 6 is a schematic diagram of a WDR circuit according to an embodiment of the present disclosure. The WDR circuit 600 may, in some embodiments, be included in the WDR circuit 114 of FIG. 1. The WDR circuit 600 may generally be similar to the WDR circuit 400 of FIG. 4, and for the sake of brevity, operations, features, and components previously described with respect to the WDR circuit 400 will not be repeated again. Unlike the WDR circuit 400, the WDR circuit 600 includes a cryptographic circuit 608 which includes an encryption circuit used as part of a read operation. In the WDR circuit 600, during a read operation, information is read out from the secure WDR 610, and encrypted by the cryptographic circuit 608 before the encrypted information is provided to the output bus WSO.

During a read operation from the secure WDR 610, the signals ShiftWR and Sec_WDRSel (which is based on the state of the WIR 614) are both active. This may cause pulses of the clock signal WRCLK to be provided to the clock terminals of the random number generator 650 (via the AND gate 652) and the secure WDR 610 (via the AND gate 653). In the embodiment of FIG. 6, the various circuits may respond to a falling edge of the clock signal WRCLK. Responsive to each falling edge, the random number generator 650 may generate a new value of the random number randomgen_out, and the secure WDR 610 may provide one of the stored values, and then shift the stored values over one register.

In the embodiment of FIG. 6, the EOR gate 651 has a first input terminal coupled to the random number generator randomgen_out, and a second input terminal coupled to the output terminal of the secure WDR 610. The output terminal of the EOR gate 651 is coupled to the one of the input terminals of the multiplexer 656. In this way, the EOR gate 651 may encrypt the output of the secure WDR 610 based on the random number randomgen_out, to provide an encrypted output to the output bus WSO.

Figure 7:
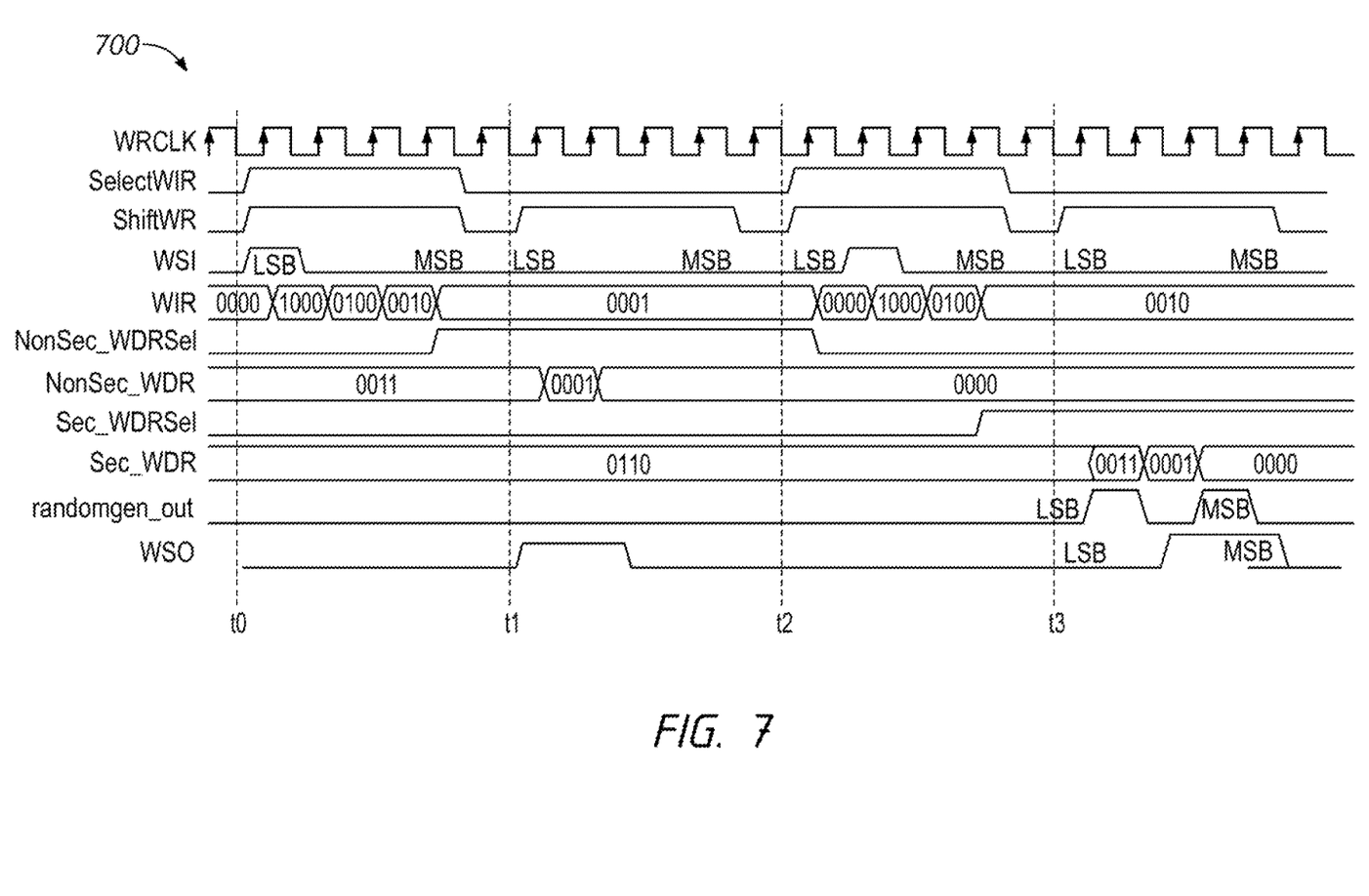
FIG. 7 is a timing diagram of write operations according to an embodiment of the present disclosure.

FIG. 7 is a timing diagram of write operations according to an embodiment of the present disclosure. The timing diagram 700 may, in some embodiments, depict the operations of the WDR circuit 600 of FIG. 6. Since the timing diagram 700 may generally be similar to the timing diagram 500 of FIG. 5, for the sake of brevity, similar features and operations to the timing diagram 500 will not be repeated again for the timing diagram 700.

Since the timing diagram 700 depicts a read operation rather than a write operation, the various operations of the timing diagram 700 are synched to the falling edges of the clock signal WRCLK (rather than the rising edges as shown in FIG. 5). At an initial time period, the WIR (e.g., WIR 614) is activated and the value 0001 is written to the WIR by writing the values 1, 0, 0, and then 0 to the shift register. This value in the WIR causes the select signal for the non-secure WDR NonSec_WDRSel to become active. Starting at the time t1, the value in the non-secure WDR 0011 is written out to the output bus WSO as the values 1, 1, 0, then 0. At a time t2, the WIR is activated again the value 0010 is written to the WIR by providing the values 0, 1, 0, then 0 along the input bus WSI. This may cause the secure select signal Sec_WDRSel to become active.

Starting at the time t3, information may be read out from the secure WDR, encrypted, and then the encrypted data may be written to the output bus WSO. Before the time t3, the secure WDR stores the value 0110. At a first falling edge at t3, the value 0 is readout of the secure WDR (leaving the value of the secure WDR as 0011). The read out value of 0 is provided to the EOR gate along with the value of the randomgen_out which is 0. The EOR of 0 and 0 is 0, so a low logical level is provided to the WSO. At a next falling edge of the clock signal WRCLK, the value 1 is read out of the secure WDR and EOR'd with the randomgen_out of 1, to give an output along the WSO of 0. At a third falling edge of the clock signal WRCLK, the value 1 is read out of the secure WDR and EOR'd with the ramdongen_out of 0 to give an encrypted value of 1 along the WSO. At the fourth falling edge of the clock signal WRCLK, the value 0 is read out of the secure WDR and EOR'd with the randomgen_out of 1 to give a value of 1 along the output bus WSO.

Accordingly, the value 0110 stored in the secure WDR is encrypted by the values of the random number randomgen_out to provide an output sequence of 0, 0, 1, and 1. Without knowledge of the values of the random number randomgen_out over time, it may be difficult or impossible to extract the value 0110 from the output sequence 0, 0, 1, and 1. The values 0011 may be provided along the output bus and may end up stored in a data file (e.g., information 122 of FIG. 1). The data file may later be retrieved by the vendor organization, which may use knowledge of the random number over time to decrypt the information in order to recover the original sequence of 0110.

It should be noted, that while the embodiment of FIG. 4 shows a circuit which decrypts incoming information as part of a read operation, and FIG. 6 shows a circuit which encrypts outgoing information as a part of a write operation, in some embodiments the features of FIGS. 4 and 6 may be combined for a WDR circuit which does both. Such a circuit may include an EOR gate (such as EOR gate 451) positioned between the input bus WSI and the input terminal of the secure WDR and an EOR gate (such as the EOR gate 651) positioned between the output terminal of the secure WDR and the output bus WSO. In some embodiments, the two EOR gates may share a random number generator (e.g., be coupled in common to randomgen_out). In some embodiments they may have separate random number generators. A circuit which performs both functions may have the operations shown in both the timing diagrams of FIGS. 5 and 7.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a high bandwidth memory (HBM) including a first register, a second register, a third register, a decoder circuit coupled to the third register and a cryptographic circuit coupled to the first register and configured to perform encryption, decryption, or a combination thereof;
   a host device; and
   an interface bus configured to couple information between the HBM and the host device, wherein the information comprises an encrypted portion of the information, wherein the encrypted portion of the information is at least one of received from or provided to the cryptographic circuit and the first register, and wherein the host device is configured to provide a select signal along the interface bus to the HBM to set a state of the third register, wherein the third register is configured to provide a first signal to the decoder circuit to activate the first register via signals from the decoder circuit to the first register and activate a random number generator of the cryptographic circuit based on the state, wherein the third register is configured to provide a second signal to the decoder circuit to activate the second register via signals from the decoder circuit to the second register based on the state, and wherein the third register is configured to provide a third signal directly to a multiplexer to select whether the first register or the second register provides information to the interface bus based on the state.

2. The apparatus of claim 1, wherein a second portion of the information is unencrypted, and wherein the second portion of the information is at least one of received from or provided to the second register.

3. The apparatus of claim 1, wherein the first register is coupled to a secure circuit of the HBM and wherein the second register is coupled to a non-secure circuit of the HBM.

4. The apparatus of claim 1, wherein the cryptographic circuit is configured to receive input data along the interface bus, decrypt the received input data, and provide the decrypted input data to the first register.

5. The apparatus of claim 1, wherein the cryptographic circuit is configured to receive output data from the first register, encrypt the received output data, and provide the encrypted output data along the interface bus.

6. The apparatus of claim 1, wherein the cryptographic circuit includes the random number generator.

7. The apparatus of claim 1, wherein the first register includes a first wrapper data register and wherein the second register includes a second wrapper data register.

8. The apparatus of claim 1, wherein the HBM is further configured to generate one or more additional select signals based at least in part on the state of the third register to activate the first register or the second register, wherein the activated first or second register receives or provides the one or more portions of the information along the interface bus.

9. A method comprising:
   receiving first information from a host device at a memory device;
   receiving second information at a first register of the memory device;
   generating a select signal in a first state or a second state based on the second information in the first register corresponding to the first state or the second state respectively;
   decrypting the first information and storing the decrypted first information in a second register of the memory device when the select signal is in the first state;
   storing the first information in a second third register of the memory device when the select signal is in the second state;
   providing a first signal to a decoder circuit coupled to the first register to activate the first register and activate a random number generator of the cryptographic circuit when third information in the first register corresponds to the first state;
   providing a second signal to the decoder circuit to activate the second register when the third information in the first register corresponds to the second state; and
   providing a third signal directly to a multiplexer to select whether the first register or the second register provides information to an interface bus.

10. The method of claim 9, further comprising:
    encrypting information stored in the second register and providing the encrypted information to the host device when the select signal is in the first state; and
    providing information stored in the third register to the host device when the select signal is in the second state.

11. The method of claim 9, further comprising testing the memory device based on the information stored in the second register.

* * * * *

UNITED STATES PATENT AND TRADEMARK OFFICE
CERTIFICATE OF CORRECTION

PATENT NO. : 11,720,719 B2
APPLICATION NO. : 16/589989
DATED : August 8, 2023
INVENTOR(S) : Chikara Kondo and Kazuhiro Kurihara It is certified that error appears in the above-identified patent and that said Letters Patent is hereby corrected as shown below:

In the Claims

| Column | Line | Claim | Reads | Should Read |
|--------|------|-------|-------|-------------|
| 16 | 24 | 9 | storing the first information in a second third register | storing the first information in a third register |

Signed and Sealed this
Seventeenth Day of October, 2023

Katherine Kelly Vidal
*Director of the United States Patent and Trademark Office*